(12) United States Patent
Kato

(10) Patent No.: US 7,486,836 B2
(45) Date of Patent: Feb. 3, 2009

(54) IMAGE PICKUP DEVICE WITH BRIGHTNESS CORRECTING FUNCTION AND METHOD OF CORRECTING BRIGHTNESS OF IMAGE

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 512 days.

(21) Appl. No.: 11/189,303

(22) Filed: Jul. 26, 2005

(65) Prior Publication Data

US 2006/0023273 A1    Feb. 2, 2006

(30) Foreign Application Priority Data

Jul. 30, 2004    (JP) .............. 2004-224738

(51) Int. Cl.
  *G06K 9/40* (2006.01)
  *G03F 3/08* (2006.01)
(52) U.S. Cl. ..................... 382/274; 358/521
(58) Field of Classification Search ......... 382/167–169, 382/274, 305, 312; 345/87, 204, 589; 348/362, 348/364; 358/1.12, 509, 519, 521, 522
  See application file for complete search history.

(56) References Cited

U.S. PATENT DOCUMENTS

| | | | |
|---|---|---|---|
| 6,462,835 B1 | 10/2002 | Loushin et al. | |
| 6,463,172 B1 | 10/2002 | Yoshimura | |
| 6,583,820 B1 * | 6/2003 | Hung | 348/362 |
| 6,850,214 B2 * | 2/2005 | Nishitani et al. | 345/87 |
| 2003/0099407 A1 | 5/2003 | Matsushima | |

FOREIGN PATENT DOCUMENTS

| | | |
|---|---|---|
| JP | 10-198802 | 7/1988 |
| JP | 7-274062 A | 10/1995 |
| JP | 2002-237995 A | 8/2002 |
| JP | 2003-179809 A | 6/2003 |
| JP | 2003-219205 A | 7/2003 |

OTHER PUBLICATIONS

Patent Abstracts of Japan, vol. 1998, No. 12, Oct. 31, 1998 and JP 10-198802 A (Seiko Epson Corp.), Jul. 31, 1998—Abstract.

* cited by examiner

*Primary Examiner*—Kanji Patel
(74) *Attorney, Agent, or Firm*—Frishauf, Holtz, Goodman & Chick, P.C.

(57) ABSTRACT

An image pickup device includes a histogram generation unit which generates a histogram representing a brightness distribution of digital image data (RAW data) acquired during picture taking and a table change unit which calculates an amount of correction with reference to a target brightness value based on the histogram and changes gradation correction information of a gamma lookup table in accordance with the amount of correction. A gamma correction unit corrects gradation of the image data using the changed gradation correction information to generate a taken image whose brightness is corrected in accordance with the target brightness value.

14 Claims, 5 Drawing Sheets

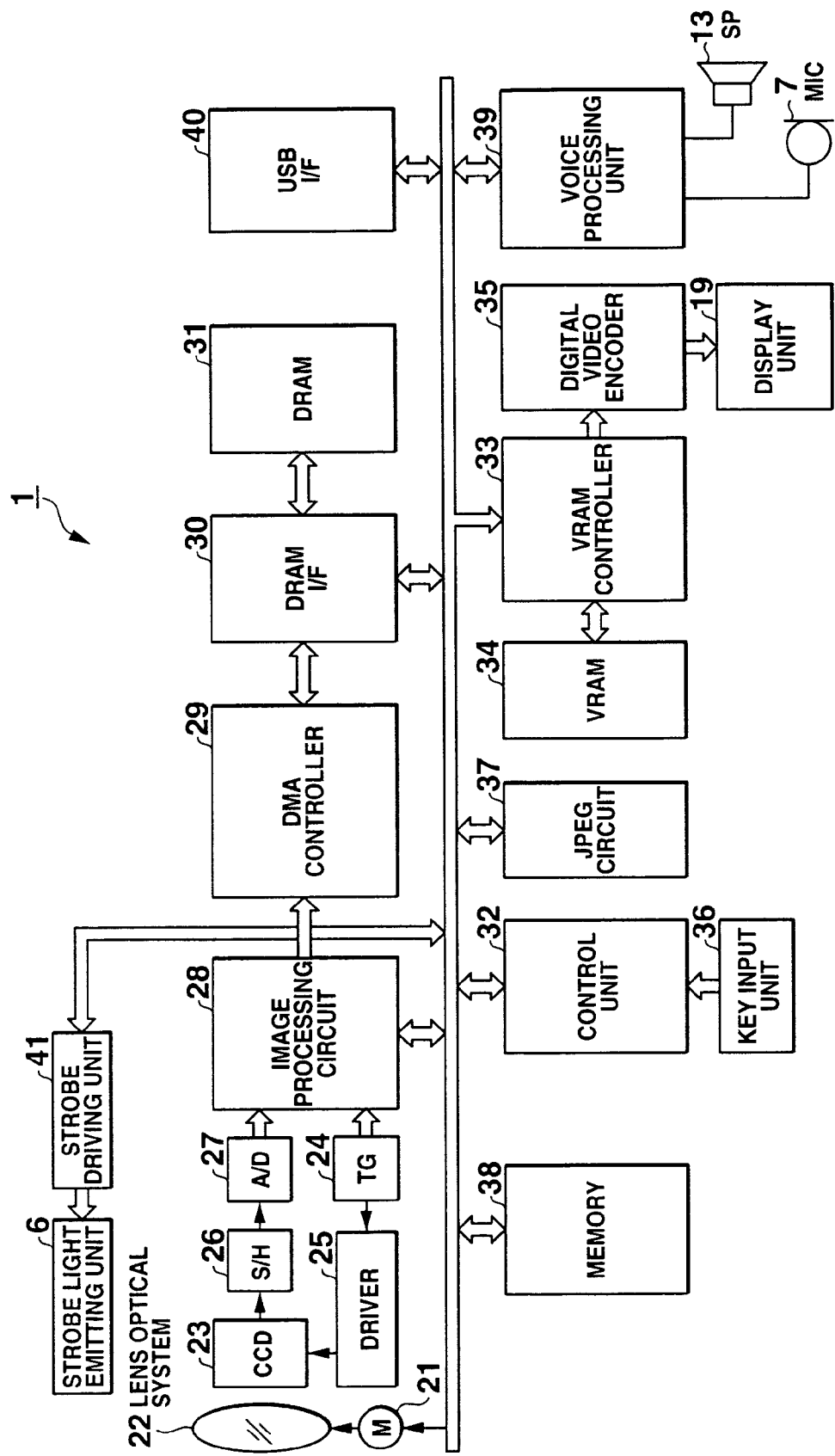

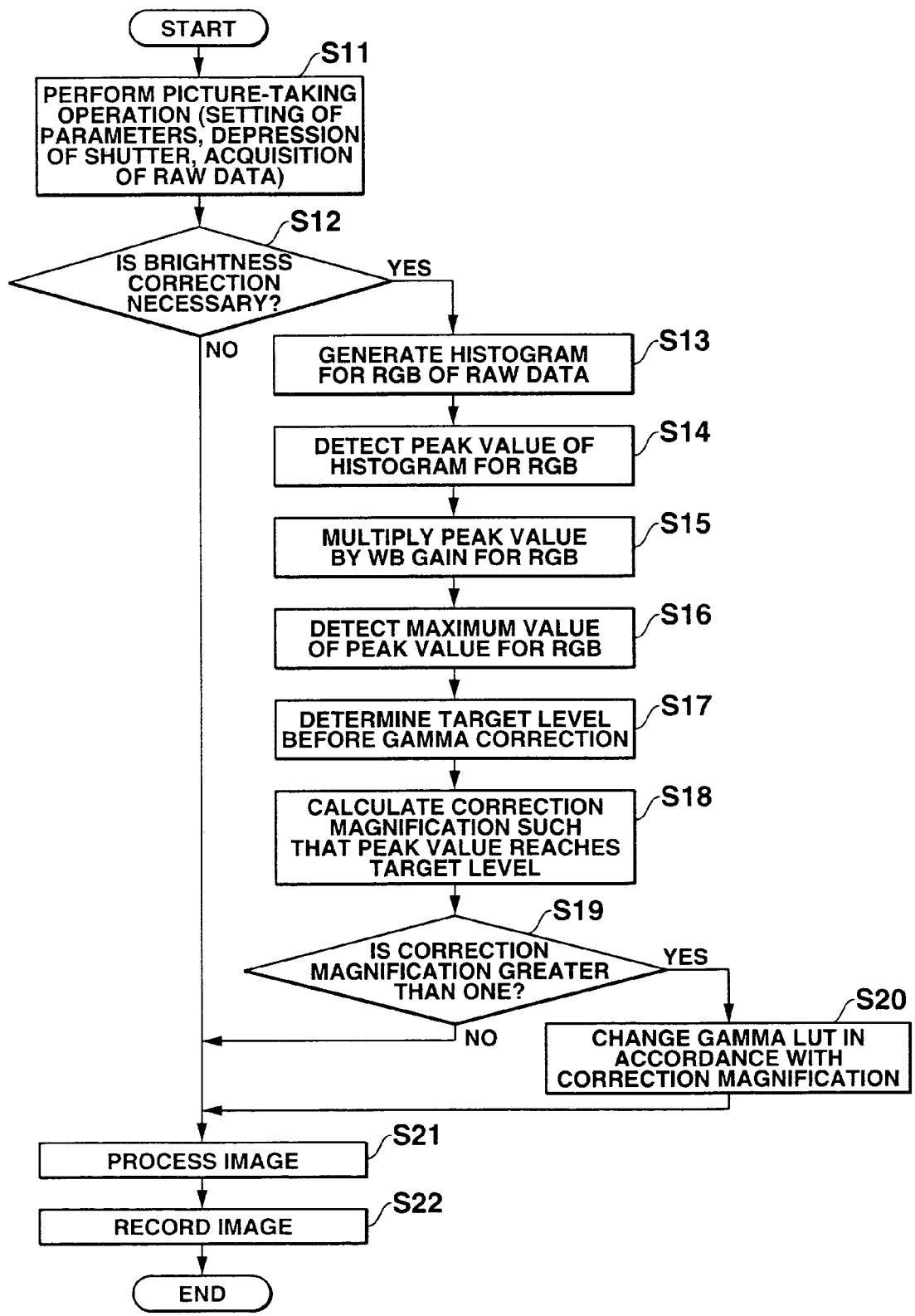

RAW DATA HISTOGRAM R  R-PEAK (547)  TARGET

RAW DATA HISTOGRAM G  G-PEAK (541)

RAW DATA HISTOGRAM B  B-PEAK (543)

IMAGE PICKUP DEVICE WITH BRIGHTNESS CORRECTING FUNCTION AND METHOD OF CORRECTING BRIGHTNESS OF IMAGE

CROSS-REFERENCE TO RELATED APPLICATIONS

This application is based upon and claims the benefit of priority from prior Japanese Patent Application No. 2004-224738, filed Jul. 30, 2004, the entire contents of which are incorporated herein by reference.

BACKGROUND OF THE INVENTION

1. Field of the Invention

The present invention relates to an image pickup device such as a digital camera. More specifically, the invention relates to an image pickup device with a brightness correcting function of correcting the brightness of an image and a method of correcting the brightness of an image used in the image pickup device.

2. Description of the Related Art

A digital camera includes a strobe light for compensating for a shortage of luminous energy during picture taking. Since, however, the range of flashes of the strobe light is relatively short, the strobe light may not emit an adequate amount of light when a picture of distant scenery or a picture of wide range is taken.

As a digital camera has recently decreased in size, a strobe light loaded into the camera has tended to do so. Not only the small strobe light emits a small amount of light, but also the camera decreases in sensitivity due to the downsizing of cells of image pickup elements. These factors cause a shortage of luminous energy even though a strobe light is used and thus often make it impossible to form an image with desired brightness.

Conventionally, exposure is controlled during picture taking as a method of correcting the brightness of an image. For example, the following technology is known. An aperture/shutter mechanism is so controlled that an amount of exposure made when the maximum Y signal (luminous signal) becomes about 70% to 100% of a dynamic range of CCD. Exposure can thus be optimized to take a picture of a bright subject brightly and take a picture of a dark subject darkly.

However, the above method is merely a correction of exposure, and the brightness of an image is simply adjusted using the aperture/shutter mechanism at the state of exposure before picture taking. It is therefore impossible to correct the brightness of an image of a taken image, such as an image of a subject at which no flashes arrive from a strobe light while the subject is being photographed.

There is a method of correcting the brightness of a taken image using specific software incorporated into a personal computer or the like. In this method, however, a user has to capture the image into the computer, confirm the brightness of the taken image on the screen of the computer and adjust it finely through a predetermined operation. That is, the user has to perform very complicated operations.

BRIEF SUMMARY OF THE INVENTION

According to a first aspect of the present invention, there is provided an image pickup device comprising:

image pickup means for converting light, which is received from each of portions of a subject through a lens, into digital data corresponding to intensity of the light and outputting the digital data as image data;

a correction table in which gradation correction information corresponding to a conversion characteristic of the image pickup means is stored;

correction amount calculation means for calculating an amount of correction in accordance with a difference between a brightness distribution of the image data output from the image pickup means and a preset target brightness distribution;

generation means for generating new gradation correction information based on the gradation correction information stored in the correction table and the amount of correction calculated by the correction amount calculation means;

table change means for changing the gradation correction information stored in the correction table to the new gradation correction information generated by the generation means;

correction means for correcting gradation of the image data output from the image pickup means based on the new gradation correction information obtained by the table change means to correct brightness of the image data in accordance with the conversion characteristic of the image pickup means and the preset target brightness distribution, thereby generating a taken image; and recording means for recording the taken image obtained from the correction means.

According to a second aspect of the present invention, there is provided an image pickup device comprising:

image pickup means for converting light, which is received from each of portions of a subject through a lens, into digital data corresponding to intensity of the light and outputting the digital data as image data;

a correction table in which given gradation correction information is stored;

histogram generation means for generating a histogram that represents a brightness distribution of the image data output from the image pickup means;

specifying means for specifying a point corresponding to maximum brightness in the brightness distribution of the histogram generated by the histogram generation means;

calculation means for calculating a magnification such that the point specified by the specifying means is changed to a target point corresponding to preset maximum brightness in the histogram;

table change means for changing the gradation correction information stored in the correction table based on the magnification calculated by the calculation means when the magnification is greater than one;

correction means for correcting gradation of the image data based on the gradation correction information obtained by the table change means to generate a taken image whose brightness is corrected in accordance with the target point;

recording means for recording the taken image generated by the correction means.

According to a third aspect of the present invention, there is provided an image pickup device comprising:

image pickup means for converting light, which is received from each of portions of a subject through a lens, into digital data corresponding to intensity of the light and outputting the digital data as image data;

strobe light emitting means for emitting strobe light;

correction means for generating a taken image whose gradation is corrected such that a brightness distribution of the image data output from the image pickup means becomes equal to a preset target brightness distribution, when the brightness distribution of the image data is darker than the preset target brightness distribution and the image data is picked up with the strobe light emitted from the strobe light emitting means; and recording means for recording the taken image generated by the correction means.

According to a fourth aspect of the present invention, there is provided an image pickup device comprising:

image pickup means for converting light, which is received from each of portions of a subject through a lens, into digital data corresponding to intensity of the light and outputting the digital data as image data;

a correction table in which given gradation correction information is stored;

histogram generation means for generating a histogram that represents a brightness distribution of the image data output from the image pickup means for each of R, G and B;

correction amount calculation means for specifying a given percent of a portion of the histogram generated for each of R, G and B by the histogram generation means, selecting a highest value of the portion, and calculating an amount of correction based on the selected value and a target brightness value;

table change means for changing the gradation correction information of the correction table in accordance with the amount of correction calculated by the correction amount calculation means; and correction means for correcting gradation of the image data based on the gradation correction information obtained by the table change means to generate a taken image whose brightness is corrected in accordance with the target value.

BRIEF DESCRIPTION OF THE SEVERAL VIEWS OF THE DRAWING

FIG. 2 is a block diagram showing an arrangement of electronic circuits of the digital camera according to the embodiment of the present invention;

FIG. 4 is a flowchart showing an operation including a brightness correcting operation during picture taking in the digital camera according to the embodiment of the present invention;

DETAILED DESCRIPTION OF THE INVENTION

An embodiment of the present invention will be described with reference to the accompanying drawings.

Figure 1A:
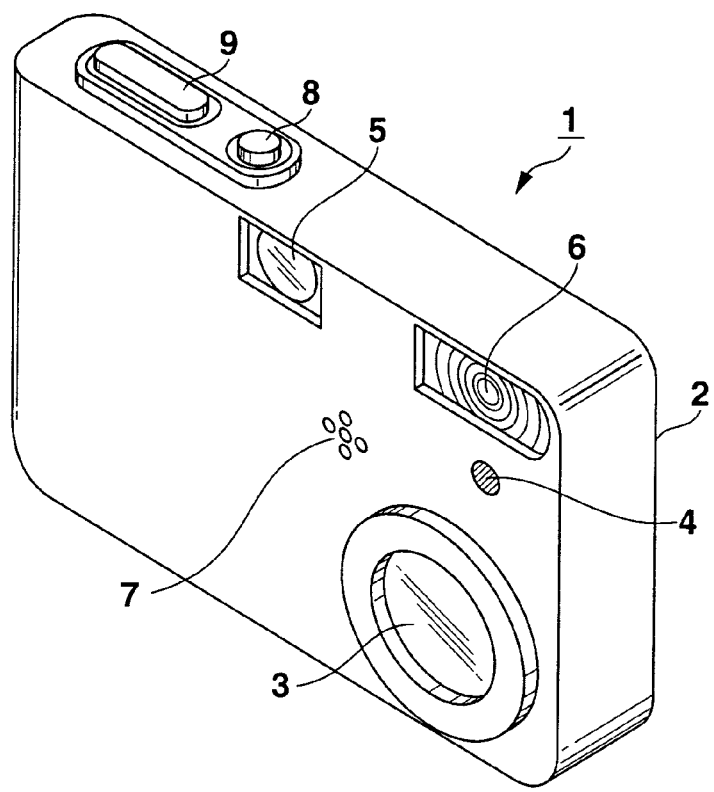
FIGS. 1A and 1B are perspective views showing an outward appearance of an image pickup device according to an embodiment of the present invention, taking a digital camera as an example, FIG. 1A showing the front of the device and FIG. 1B showing the back thereof.
Figure 1B:
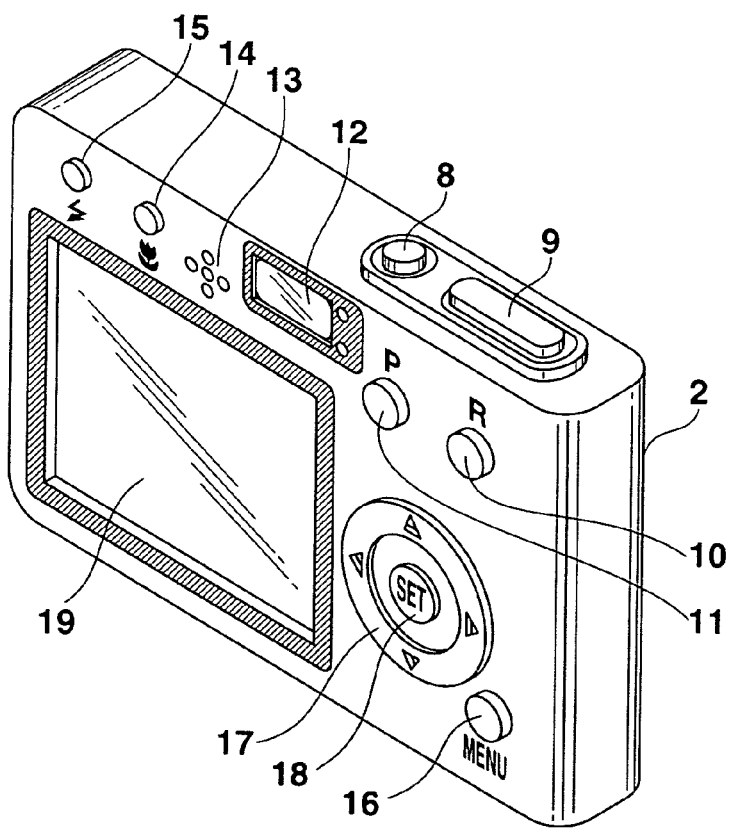

FIGS. 1A and 1B are perspective views showing an outward appearance of an image pickup device according to a first embodiment of the present invention, taking a digital camera as an example. FIG. 1A shows the front of the device and FIG. 1B shows the back thereof.

A digital camera 1 comprises a picture-taking lens 3, a self-timer lamp 4, an optical finder window 5, a strobe light emitting unit 6 and a microphone unit 7 on the front of a thin, almost rectangular body 2. On the right-end side of the front, there is provided a power key 8 and a shutter key 9.

The power key 8 is a key turning on/off a power supply. The shutter key 9 is a key for indicating picture-taking timing.

The digital camera 1 has on its back a picture-taking mode (R) key 10, a play mode (P) key 11, an optical finder 12, a speaker unit 13, a macro key 14, a strobe key 15, a menu key 16, a ring key 17, a set key 18, a display unit 19 and the like.

If the picture-taking mode key 10 operates from the power-off state, the digital camera automatically turns on and goes into a picture-taking mode for still pictures. If it operates repeatedly from the power-on state, the digital camera goes into a still-picture mode and a moving-picture mode circularly. The still-picture mode is a mode to take moving pictures and, in particular, to take voice-accompanying moving pictures.

The shutter key 9 is common to the still-picture and moving-picture modes. In the still-picture mode, a still picture is taken when the shutter key 9 is depressed. In the moving-picture mode, a moving picture starts to be taken when the shutter key 9 is depressed and its picture-taking is completed when the shutter key 9 is depressed again.

If the play mode key 11 operates from the power-off state, the digital camera automatically turns on and goes into a play mode.

The macro key 14 operates when normal picture-taking and macro picture-taking are switched to each other in the still-picture mode. The strobe key 15 operates when a light-emitting mode of the strobe light emitting unit 6 is switched. The menu key 16 operates to select one from various menu items. The ring key 17 is an integral key of up, down, right and left item selecting keys. The set key is located at the center of the ring key 17 and operates to set a selected item.

The display unit 19 is configured by a color liquid crystal display panel with backlighting. In picture-taking mode, the display unit 19 serves as an electronic finder to display a through image. In play mode, it plays and displays a selected image or the like.

Though not shown, the digital camera 1 has on its bottom a memory card slot for attaching/detaching a memory card used as a recording medium and a universal serial bus (USB) connector as a serial interface connector for connecting the device to an external personal computer or the like.

FIG. 2 is a block diagram illustrating an electronic circuit of the digital camera 1.

The digital camera 1 also comprises a lens optical system 22 including a focus lens and a zoom lens (neither of which is shown) which make up the picture-taking lens 3. The lens optical system 22 is driven by a motor 21 so that it can move along the optical axis within a predetermined range. A charged coupled device (CCD) 23 is provided as an image pickup element rearward of the lens optical system 22 with respect to the optical axis. The CCD 23 receives light from respective portions of a subject through the picture-taking lens 3 and outputs an electrical signal corresponding to the intensity of the received light.

In record mode as a basic mode, the CCD 23 is driven by a timing generator (TG) 24 and a driver 25 to output a photoelectric conversion signal for one frame, which corresponds to an optical image formed for every fixed period. The photoelectric conversion signal, which is an analog signal, is gain-controlled for each of primary color components of RGB. Then, the signal is sample-held by a sample hold circuit 26 and converted into digital data by an A/D converter 27.

After that, an image processing circuit 28 executes image processing including pixel interpolation and γ correction to generate a digital brightness signal Y and color-difference signals U and V (Cb, Cr) and output them to a direct memory access (DMA) controller 29.

The DMA controller 29 writes the digital brightness signal Y and color-difference signals U and V to a buffer incorporated therein, using a complex synchronous signal, a memory write enable signal and a clock signal from the image processing circuit 28. The DMA controller 29 DMA-transfers these signals to a DRAM 31 used as a buffer memory via a DRAM interface (I/F) 30.

A control unit 32 is formed of a microcomputer including a CPU, a ROM that stores operation programs to be executed by the CPU, and a RAM used as a work memory. The control unit 32 controls the entire operation of the digital camera 1. After the brightness signal Y and color-difference signals U and B are DMA-transferred to the DRAM 31, the control unit 32 reads these signals from the DRAM 31 via the DRAM interface 30 and writes them to a VRAM 34 via a VRAM controller 33.

A digital video encoder 35 periodically reads the brightness and color-difference signals from the VRAM 34 via the VRAM controller 33, generates a video signal based on these signals, and displays them on the display unit 19.

As described above, the display unit 19 functions as a monitor display (electronic finder) during picture taking. It performs display based on the video signal from the digital video encoder 35, thereby displaying in real time an image based on image data currently captured from the VRAM controller 33.

When the display unit 19 displays a current monitor image in real time, if the shutter key 9 is depressed at a time point where the user would like to take, for example, a still picture, a trigger signal is generated.

In response to the trigger signal, the control unit 32 interrupts the route from the CCD 23 to the DRAM 31 to assume a record-saving state immediately after it completes DMA-transferring to the DRAM 31 the brightness and color-difference signals corresponding to one frame and currently read from the CCD 23.

In the record-saving state, the control unit 32 reads the brightness and color-difference signals corresponding one frame from the DRAM 31 via the DRAM interface 30 in units of components Y, Cb and Cr and in units of basic blocks each formed of 8×8 pixels. Subsequently, the control unit 32 writes the read data to a joint photograph coding experts group (JPEG) circuit 37, and compresses the data therein utilizing adaptive discrete cosine transform (ADCT), Huffman coding as entropy coding, etc.

The control unit 32 reads the resultant code data from the JPEG circuit 37 and writes it to a recording memory 38 as a data file corresponding to one image. The memory 38 includes a memory card detachably inserted as a recording medium as well as a built-in memory. Completing compressing the brightness and color-difference signals for one frame and writing the compressed data to the memory 38, the control unit 32 activates the route from the CCD 23 to the DRAM 31 again.

A voice processing unit 39, a USB interface (I/F) 40 and a strobe driving unit 41 are also connected to the control unit 32.

The voice processing unit 39 includes a sound source circuit such as a PCM sound source. In voice recording, the unit 39 converts a voice signal supplied from the microphone unit (MIC) 7 to digital data and compresses the data in given data file format, such as MP3 (MPEG-1 audio layer 3), to create a voice data file and send it out to the memory 38. In voice reproduction, the unit 39 decompresses the voice data file, which is read out of the memory 38, into analog data and outputs it through the speaker unit (SP) 13 provided on the back of the digital camera 1.

The USB interface 40 controls communications when image data, for example, is transmitted between the digital camera 1 and another information terminal, such as a personal computer, which is connected thereto by a cable via a USB connector. During picture taking, the strobe driving unit 41 charges a large-capacitance capacitor for strobe light (not shown), and causes the strobe light emitting unit 6 to flash based on the control of the control unit 32.

A key input section 36 includes not only the above-described shutter key 9, but also a power supply key 8, a picture-taking mode key 10, a play mode key 11, a macro key 14, a strobe key 15, a menu key 16, a ring key 17 and a set key 18. A signal generated when any one of these keys is operated is directly sent to the control unit 32.

In order to take not a still picture but a moving picture, when the shutter key 9 is depressed, the JPEG circuit 37 compresses data of a moving picture using, e.g., motion-JPEG (Joint Photographic Experts Group) and stores the compressed data in the memory 38. When the shutter key 9 is depressed again, the recording of the moving picture is completed.

On the other hand, in the play mode as a basic mode, the control unit 32 selectively reads image data from the memory 38 and the JPEG circuit 37 expands it by the procedure opposite to that employed to compress data in the record mode. After saving the expanded data in the DRAM 31 via the DRAM interface 30, the control unit 32 causes the content of the DRAM 31 to be stored in the VRAM 34 via the VRAM controller 33, and periodically reads image data from the VRAM 34 to generate a video signal and play it back on the display unit 19.

If the selected image data is not a still picture but a moving picture, still picture data items of a plurality of frames that make up the moving picture are played and displayed sequentially in time series. When playback of all still picture data items is completed, the leading still picture data item is displayed until the next playback instruction is provided.

Figure 3:
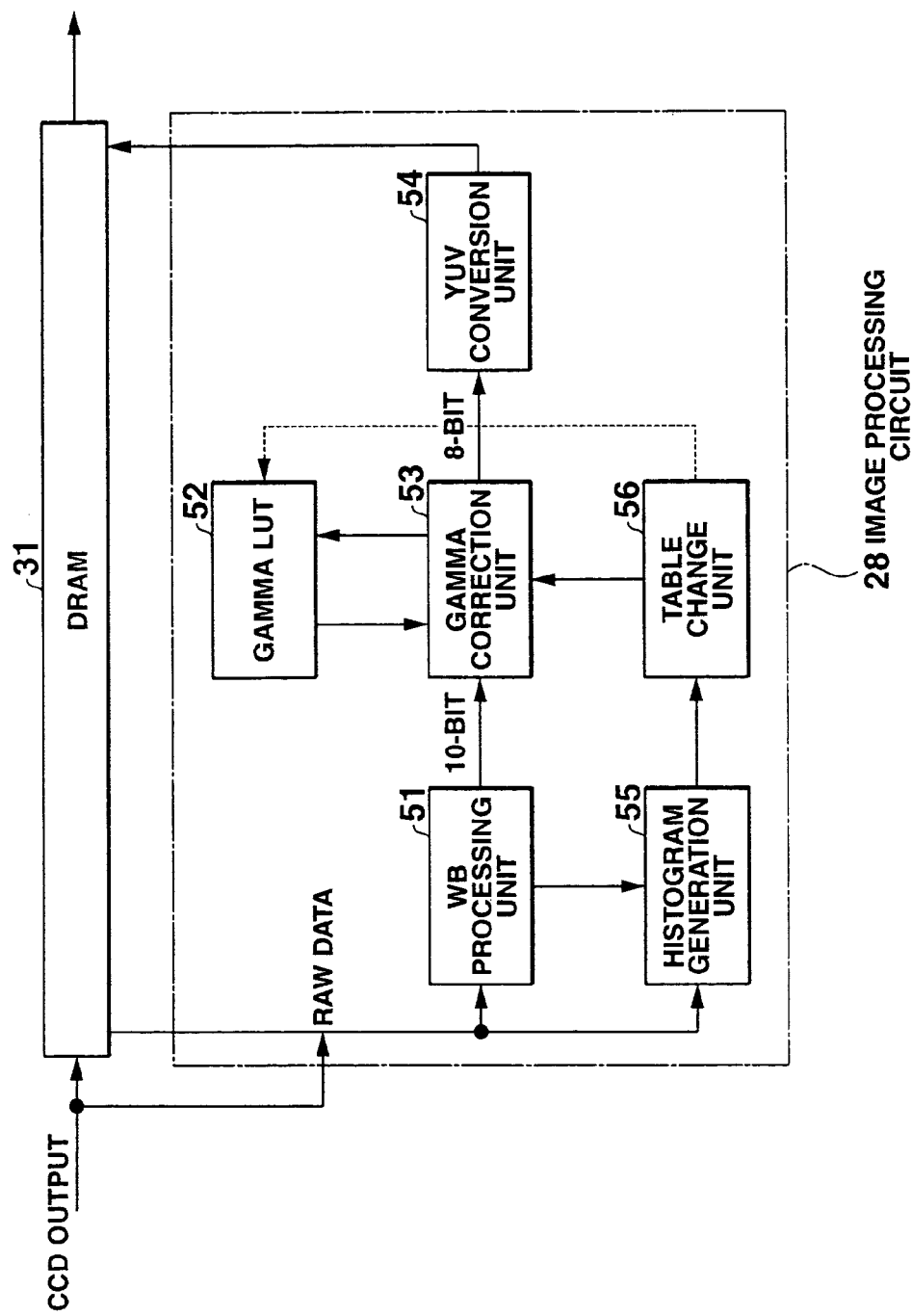
FIG. 3 is a block diagram of functions of an image processing circuit included in the digital camera according to the embodiment of the present invention.

FIG. 3 is a block diagram of functions of the image processing circuit 28. In order to simply describe a flow of data between the circuit 28 and the DRAM 31, for example, the DRAM controller 29 and the DRAM interface (I/F) 30 shown in FIG. 2 are omitted from FIG. 3.

In FIG. 3, a CCD output represents digital image data that is output from the CCD 23 via the sample hold circuit 26 and the A/D converter 27 during picture taking. In the present embodiment, since the A/D converter 27 is 10-bit, 10-bit digital image data is input to the image processing circuit 28. This raw digital image data is referred to as RAW data hereinafter. The RAW data is once held in an image area of the DRAM 31 used as a buffer memory, and then read therefrom and supplied to the image processing circuit 28 to be processed therein.

The RAW data can be processed directly in the image processing circuit 28 without holding it in the image area of the DRAM 31. The DRAM 31 can be replaced with an SDRAM or the like as a buffer memory. The present invention is not particularly limited to these configurations.

The image processing circuit 28 is formed of a one-chip LSI and includes, as basic components, a white balance processing unit (WB processing unit) 51 that multiplies the RAW data by a given WB gain, a gamma lookup table (gamma LUT) 52 to which a gamma curve from 10 bits to 8 bits is set, a gamma correction unit 53 which corrects gradations of the RAW data multiplied by the WB gain with reference to the gamma lookup table 52, and a YUV conversion unit 54 that YUV-converts the RAW data whose gradations are corrected.

In addition, the image processing circuit 28 includes a histogram generation unit 55 and a table change unit 56. These units 55 and 56 are components for achieving brightness correction according to the embodiment of the present invention.

The histogram generation unit 55 generates a histogram that represents the brightness distribution for each of R, G and B of RAW data. The table change unit 56 compares the histogram generated by the unit 55 with a predetermined target value to calculate an amount of brightness correction and change the gamma lookup table 52 in accordance with the amount of brightness correction.

The process of the image processing circuit 28 can be performed by software by the control unit 32. Since, however, it takes time to perform the whole process by software, it is favorable that basic components of at least the white balance processing unit 51, gamma lookup table 52, gamma correction unit 53 and YUV conversion unit 54 be made of hardware.

An operation of the image pickup device according to the embodiment of the present invention will be described.

FIG. 4 is a flowchart showing a flow of an operation including a brightness correcting operation during picture taking in the digital camera 1. This operation is carried out by controlling the respective circuits in accordance with the procedure described in programs by the control unit 32 that is a microprocessor incorporated in the digital camera 1.

In taking a still picture, first, the control unit 32 sets parameters such as a shutter speed and an f-number to adjust exposure, then performs a picture-taking operation with timing when the shutter key 9 is depressed, and acquires digital image as RAW data from the CCD 23 through the sample hold circuit 26 and the A/D converter 27 (step S11). This RAW data is once held in the image area of the DRAM 31 via the image processing circuit 28.

The control unit 32 determines whether brightness correction is necessary or not, on the basis of the following conditions (step S12).

Assume that "brightness correction mode" which can be set arbitrarily by a user on, e.g., a menu screen is prepared. The control unit 32 determines that brightness correction is necessary when the "brightness correction mode" is set in the ON state, and determines that it is not necessary when it is set in the OFF state (condition 1). In other words, the brightness correction is determined according to the user's arbitrary setting of the mode.

When a picture is taken under a dark environment such as in the nighttime using a strobe light emitting function, there is a strong possibility that a taken image will become dark because of a shortage of luminous energy; therefore, the control unit 32 determines that brightness correction is necessary (condition 2). In this case, it is desirable to correct brightness when a picture is taken using a strobe based on the premise that the "brightness correction mode" of condition 1 is set.

"Continuous-exposure mode" for taking pictures continuously requires a high-speed operation. It is thus desirable to inhibit brightness correction because this correction takes a long time to complete. The control unit 32 determines that brightness correction is unnecessary when the "continuous mode" is set in the ON state (condition 3).

If the control unit 32 determines that brightness correction is unnecessary on the basis of the above conditions 1 to 3 (NO in step S12), it sends a RAW data from the DRAM 31 to the image processing circuit 28 to process a normal image without brightness correction and thus generate a luminous signal Y and color-difference signals U and V (step S21).

More specifically, first, the white balance processing unit 51 multiples the RAW data read out of the DRAM 31 by a white balance gain (WB gain) for each of R, G and B to adjust control signals. Then, the gamma correction unit 53 corrects gradations of the RAW data with reference to the gamma lookup table 52. At this time, the table 52 stores predetermined gradation correction information (gamma curve) that is set in advance as a standard value (see standard curve of "1.0-times" in FIG. 6). As will be described later, in bright correction, the gradation correction information (gamma curve) of the gamma lookup table 52 is varied with an amount of correction.

The gamma correction unit 53 outputs 8-bit image data whose gradation is corrected. The YUV conversion unit 54 converts the image data into luminous signal Y indicative of brightness information and color-difference signals U and V (Cb, Cr) indicative of color information and supplies these signals to the image area of the DRAM 31.

After the above image processing, the control unit 32 reads the luminous signal and color-difference signals out of the DRAM 31 and send them to the JPEG circuit 37. Then, the unit 32 compresses the signals in given format and stores them in the memory 38 as a taken image (step S22).

On the other hand, if the control unit 32 determines that brightness correction is necessary (YES in step S12), it is performed by the following procedure. In the present embodiment, the brightness correction is done by hardware in the image processing circuit 28 shown in FIG. 3.

First, the control unit 32 reads the RAW data, which is digital image data obtained from the CCD 23, out of the DRAM 31 and supplies it to the histogram generation unit 55 in the image processing circuit 28 to generate a histogram representing the brightness distribution for each of R, G and B (step S13). In this case, data of not all pixels is required, but data of some pixels can be deleted in accordance with the operation speed. Though the brightness correction is performed by hardware in the circuit, it can be done by software.

Figure 5A:
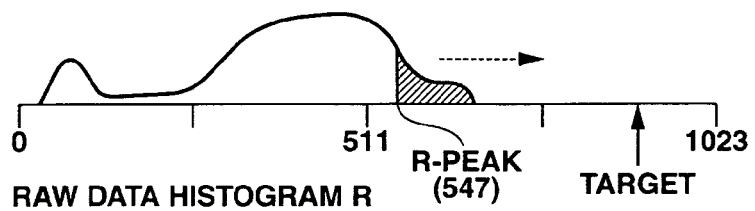
FIGS. 5A to 5C are graphs each showing an example of a histogram of RAW data in the digital camera according to the embodiment of the present invention, the graphs showing the distribution of brightness of each of R data, G data and B data.
Figure 5B:
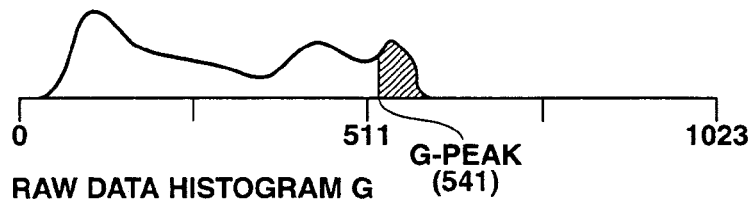
Figure 5C:
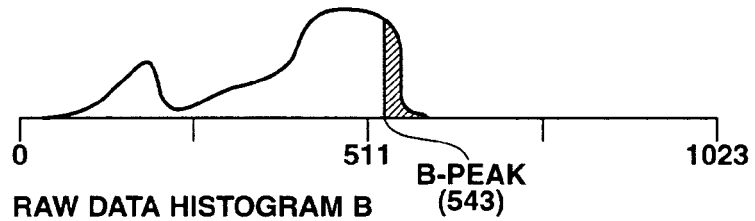

FIGS. 5A to 5C are graphs each showing an example of a histogram of RAW data. More specifically, FIG. 5A shows the brightness distribution of R data, FIG. 5B shows the brightness distribution of G data and FIG. 5C shows the brightness distribution of B data. In these graphs, the brightness is represented by a 10-bit digital value (1024 values) while the left side is "black" and the right side is "white."

Amounts of distribution existing from the high-luminance side of the histogram are accumulated for each of R, G and B of RAW data to detect a level that corresponds to the high-luminance rate defined as a proper amount. For example, an area (each of hatched areas in FIGS. 5A to 5C) corresponding to the high-luminance rate of 3% is defined as an appropriate amount of brightness, thereby detecting peak levels (R-PEAK, G-PEAK, B-PEAK) of 3% areas for R, G and B of the RAW data (step S14).

The setting of white balance is not taken into consideration for the RAW data. The histogram generation unit 55 thus multiplies the peak levels of the RAW data by WB gains (wb_r_gain, wb_g_gain, wb_b_gain) for R, G and B to obtain the following peak levels (R-PEAK_WB, G-PEAK_WB, B-PEAK_WB) after the white balance processing (step S15).

$R\text{-PEAK}\_WB = R\text{-PEAK} * wb\_r\_gain$ $G\text{-PEAK}\_WB = G\text{-PEAK} * wb\_g\_gain$ $B\text{-PEAK}\_WB = B\text{-PEAK} * wb\_b\_gain$ In order to correct brightness based on the brightest color element in R, G and B, the table change unit 56 selects the highest one (MOST_PEAK) of the peak levels obtained in step S15 (step S16).

Assuming in FIG. 5, that R-PEAK_WB is equal to 547, G-PEAK_WB is equal to 541 and B-PEAK_WB is equal to 543, "547" of R data is selected as MOST_PEAK.

A target level (TARGET_LEVEL) is determined before the R data is gamma-corrected (step S17). In order to make the 3% area of the current R data brighter, a target level to do so is preset as indicated by a dotted arrow. This target level can be set in advance as a fixed value or freely by a user. It is favorable that the fixed value be one (e.g., about 900) which is slightly lower than the maximum value "1023" in consideration of the subsequent gamma correction.

Assume that when a user freely sets a target level, he or she depresses the menu key 16 to display a setting screen of the "target level" and input an arbitrary numeric value as the target level within the range from 0 to 1023 on the setting screen. In this case, the fixed value can be displayed as a default and freely changed based on the default.

If the target level of brightness is set as described above, the table change unit 56 obtains the following correction magnification (ASSIST_RATIO) so that the peak value obtained in step S16 reach the target level (step S18).

ASSIST_RATIO=TARGET_LEVEL/MOST_PEAK

The control unit 32 determines whether the correction magnification (ASSIST_RATIO) obtained in step S18 is greater than one (step S19). If it is not greater than one (NO in step S19), there is no problem in brightness distribution and thus the above-described normal image processing is executed without brightness correction (step S21).

If the correction magnification is greater than one (YES in step S19), it means a shortage of brightness. Thus, the table change unit 56 changes the gamma lookup table 52 in accordance with the correction magnification (ASSIST_RATIO) (step S20).

Figure 6:
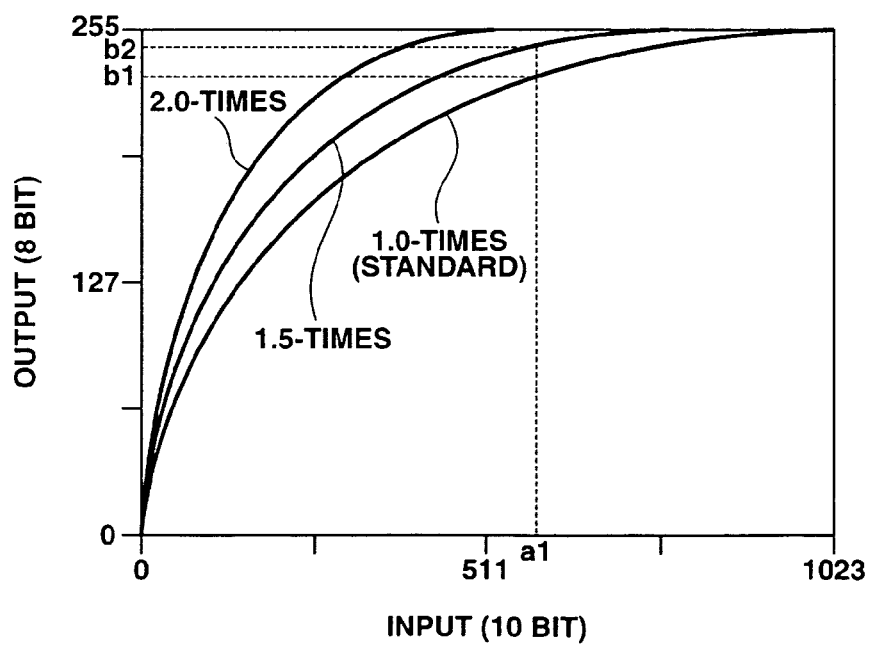
FIG. 6 is a graph describing characteristics of gamma curves and a change in range of input in the digital camera according to the embodiment of the present invention.

More specifically, as shown in FIG. 6, the gamma lookup table 52 is changed in which direction its input range is narrowed in accordance with the correction magnification such as 1.5-times and 2.0-times using a preset 1.0-time gamma curve (gradation correction information) as a standard. For example, in the 1.5-times gamma curve, when an input value is a1, an output value becomes b2, which indicates a brighter image than the output value b1 in the standard curve.

FIG. 6 shows only the 1.5-times gamma curve and the 2.0-times gamma curve. Actually, the curve can be varied in stepless fashion according to the correction magnification. In this case, the maximum value of the correction magnification can be limited. If a value of 4.0-times is set as a limit value, the correction magnification can be prevented from exceeding the limit value greatly.

Assuming that a table value which has not been varied (standard: 1.0 time) is NORMAL_TABLE (n) and a table value which has been varied is ASSIST_TABLE (n), the following equation is given:

ASSIST_TABLE(n)=ASSIST_RATIO×NORMAL_TABLE(n)

where n is all values of the table, i.e., 0 to 1023. In the changed table, however, when n exceeds "255" that is the maximum value of 8-bit output, it is cut off and output as "255."

After that, the RGB image of the RAW data is processed using the changed gamma lookup table 52 (step S21) to generate image data whose brightness has been corrected in accordance with the target level. This image data is YUV-converted, then compressed in given format by the JPEG circuit 37 and recorded in the memory 38 as a taken image (step S22).

When the taken image is short of brightness, it can be recorded with its brightness corrected automatically. Even when a subject is photographed darkly because of a shortage of luminous energy of strobe light, its image with the same brightness as that of an image taken by an adequate amount of strobe light can easily be acquired.

Bright correction causes a problem that noise is amplified in accordance with an amount of brightness correction. Brightness correction is not always performed but only when the control unit determines that it is necessary based on the above conditions 1 to 3. It is therefore possible to prevent an image from deteriorating in quality because of unnecessary correction.

There is a method of controlling the brightness of image data by selecting one of a number of gamma tables that are prepared in advance. However, this method requires the memory capacity corresponding to the number of tables. Since the number of tables that can be prepared in advance is limited, brightness cannot finely be corrected in stepless fashion in accordance with various scenes.

In the method according to the present embodiment, only one reference gamma curve (degradation correction information) is prepared in advance, and a new gamma curve (degradation correction information) is obtained by an appropriate operation in accordance with an amount of correction based on the reference gamma curve. The number of gamma tables is only one, which produces the following advantages. The memory capacity can be reduced and brightness can finely be corrected in stepless fashion in accordance with various scenes.

If the device has a picture-taking mode that can freely be set by a user like a contrast mode, the user has to change the gamma curve in accordance with a mode set by the user. In this case, too, the gamma table is changed based on the gamma curve corresponding to the mode and thus a relative relationship can be maintained between the curves before and after the gamma table is changed. However, such a relationship cannot be maintained in a method of correcting brightness by selecting one of a number of tables.

In the foregoing embodiment, the brightness correction is performed by hardware in the image processing circuit 28 shown in FIG. 3. If this brightness correction is programmed, it can be performed by software in the control unit 32 serving as a microprocessor.

It is assumed in the foregoing embodiment that the brightness of image data is corrected in its high-luminance direction; however, it can be corrected in its low-luminance direction by the same method. More specifically, in FIG. 5, a peak value of a 3% area for each of R, G and B of image data from the low-luminance side is detected and the highest peak value is compared with a target level close to zero to obtain an amount of correction. In accordance with the amount of correction, the reference gamma curve shown in FIG. 6 is varied in an opposite direction. Thus, the image data can be recorded with its dark portion more darkly.

The present invention is not limited to a digital camera but can be applied to all electronic devices having a digital camera as an image pickup device, such as a cellular phone with a camera. In particular, the present invention is effective in a small-sized device whose image pickup device is small and which can include only a small-sized strobe, such as a cellular phone with a camera.

According to the present invention described above, a number of correction tables are not required, but a high-quality taken image can be recorded by efficiently making both gradation correction and brightness correction at once during picture taking, and a complicated operation of controlling the brightness of the taken image read in a personal computer and the like.

When a portion of the histogram of image data corresponding to the maximum brightness does not reach the preset target brightness, the brightness of the image data can be corrected automatically in accordance with the target brightness and a drawback due to unnecessary correction can be avoided.

A bright image can be obtained by automatically compensating for a shortage of luminous energy of a strobe during picture taking.

The brightness of an image can be corrected by paying attention to the most prominent color element of R, G and B.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup device comprising:
    image pickup means for taking an image of a subject and outputting image data;
    strobe light emitting means for emitting strobe light when the image pickup means takes the image of the subject;
    correction means for executing gradation correction of the image being taken by the image pickup means such that a brightness distribution of the image data becomes equal to a preset target brightness distribution, if the brightness distribution of the image data output from the image pickup means is different than the preset target brightness distribution;
    correction recording means for recording, in a predetermined memory, image data obtained by subjecting the image data output from the image pickup means when taking the image to gradation correction by the correction means; and
    control means for urging the correction means to execute a first gradation correction to change the brightness distribution to a direction of greater brightness if the brightness distribution of the image data output from the image pickup means is darker than the preset target brightness distribution when the image is taken by the image pickup means while strobe light is emitted by the strobe light emitting means;
    wherein the control means urges the correction means to execute a second gradation correction corresponding to a conversion characteristic of the image pickup means different than the first gradation correction if the brightness distribution of the image data output from the image pickup means is higher than the preset target brightness distribution or if the image is not taken while the strobe light is being emitted from the strobe light emitting means.

2. An image pickup device according to claim 1, further comprising:
    a correction table in which gradation correction information corresponding to a conversion characteristic of the image pickup 5 means is stored;
    correction amount calculation means for calculating an amount of correction in accordance with a difference between a brightness distribution of the image data output from the image pickup means and a preset target brightness distribution;
    generation means for generating new gradation correction information based on the gradation correction information stored in the correction table and the amount of correction calculated by the correction amount calculation means; and
    table change means for changing the gradation correction information stored in the correction table to the new gradation correction information generated by the generation means;
    wherein the image pickup means converts light input from each of a plurality of portions of a subject through a lens into digital data corresponding to intensity of the light and outputs the digital data as image data;
    wherein the correction means executes the second gradation correction to correct the brightness distribution corresponding to the conversion characteristic of the image pickup means by subjecting image data output from the image pickup means to gradation correction based on the gradation correction information stored in the correction table;
    wherein if the brightness distribution of the image data output from the image pickup means is darker than the preset target brightness distribution when the strobe light is emitted by the strobe light emitting means while the image is being taken by the image pickup means, the control means urges the correction means to execute the first gradation correction and the second gradation correction simultaneously by urging the table change means to change the gradation correction information stored in 35 the correction table to the new gradation correction information generated by the generation means.

3. The image pickup device according to claim 2, further comprising:
    histogram generation means for generating a histogram that represents the brightness distribution of the image data output from the image pickup means; and
    specifying means for specifying a given percent of a portion of the histogram generated by the histogram generation means, wherein the correction amount calculation means calculates the amount of correction based on a value of the portion specified by the specifying means and a target brightness value.

4. The image pickup device according to claim 2, further comprising:
    histogram generation means for generating a histogram that represents the brightness distribution of the image data output from the image pickup means; and
    specifying means for specifying a point corresponding to given brightness in the brightness distribution of the histogram generated by the histogram generation means,
    wherein the correction amount calculation means calculates a magnification as the amount of correction in accordance with a difference between the point specified by the specifying means and a preset target point on the histogram, and
    wherein the generation means changes the gradation correction information stored in the correction table such that the gradation correction information is shifted as a whole in accordance with the magnification calculated by the correction amount calculation means, thereby to generate new gradation correction information in which a gamma curve indicated by the gradation correction information not changed is entirely maintained.

5. The image pickup device according to claim 4, wherein the specifying means specifies a point corresponding to maximum brightness in the brightness distribution represented by the histogram generated by the histogram generation means,
   wherein the correction amount calculation means calculates a magnification as the correction amount such that the point specified by the specifying means is changed to a target point corresponding to preset maximum brightness on the histogram, and wherein the table change means changes the gradation correction information stored in the correction table when the magnification is greater than one.

6. The image pickup device according to claim 5, wherein the correction table stores the gradation correction information in a form of output values corresponding to input values, and
   wherein the generation means changes the output values stored in the correction table so as to shift the input values corresponding thereto to generate new gradation correction information.

7. The image pickup device according to claim 2, further comprising:
   histogram generation means for generating a histogram that represents a brightness distribution of the image data output 5 from the image pickup means for each of R, G and B; and
   specifying means for specifying a portion of the histogram generated for each of R, G and B by the histogram generation means,
   wherein the correction amount calculation means selects a highest value of the specified portion corresponding to each of R, G and B specified by the specifying means, and calculates an amount of correction based on the selected value and a target brightness value.

8. The image pickup device according to claim 7, further comprising gain control means for multiplying a value of the portion of the histogram generated for each of R, G and B by the histogram generation means by a given gain,
   wherein the correction amount calculation means selects a highest value from values obtained by the gain control means and calculates an amount of correction based on the selected value and a target brightness value.

9. The image pickup device according to claim 1, further comprising determination means for determining whether brightness correction is necessary based on predetermined conditions,
   wherein if the determination means determines that the brightness correction is necessary, the control means urges the correction means to execute the first gradation correction.

10. The image pickup device according to claim 9, further comprising mode setting means for setting a specific mode in which the brightness correction is effective,
    wherein the determination means determines that the brightness correction is necessary when the mode setting means sets the specific mode.

11. The image pickup device according to claim 9, further comprising mode setting means for setting a continuous-exposure mode for taking a picture continuously,
    wherein the determination means determines that the brightness correction is unnecessary when the mode setting means sets the continuous mode.

12. The image pickup device according to claim 1, wherein when the strobe light is not emitted by the strobe light emitting means, the control means controls the correction means not to execute the first gradation correction even if the brightness distribution of the image data output from the image pickup means is darker than the preset target brightness distribution.

13. The image pickup device according to claim 1, wherein if the brightness distribution of the image data output from the image pickup means is brighter than the preset target brightness distribution, the control means 5 controls the correction means not to execute the first gradation correction irrespective of the emission of the strobe light from the strobe light emitting means.

14. A method of correcting brightness in an image pickup device, comprising:
    taking an image of a subject and outputting image data;
    emitting strobe light while the image of the subject is being taken;
    executing gradation correction of the taken image such that the brightness distribution of the image data becomes equal to the preset target brightness distribution if a brightness distribution of the image data output is different than a preset target brightness distribution;
    recording, in a predetermined memory, the image data obtained by subjecting the image data of the taken image to gradation correction;
    urging a first gradation correction to be executed to change 15 the brightness distribution to a direction of greater brightness if the brightness distribution of the image data output in the image pickup step is darker than the preset target brightness distribution when the image is taken while strobe light is being emitted; and
    urging a second gradation correction to be executed corresponding to a conversion characteristic different than the first gradation correction if the brightness distribution of the image data output from the image pickup step is higher than the preset target brightness distribution or if the image is not taken while the strobe light is being emitted.

* * * * *